United States Patent [19]

Semrau

[11] Patent Number: 5,696,704
[45] Date of Patent: Dec. 9, 1997

[54] NON-LINEAR SCALE INSTRUMENT

[75] Inventor: Heinz A. Semrau, Strasbury, Va.

[73] Assignee: VDO North America, Inc., Winchester, Va.

[21] Appl. No.: 472,395

[22] Filed: Jun. 7, 1995

[51] Int. Cl.$^6$ .................. G01B 5/00; G01R 13/00
[52] U.S. Cl. ............ 364/561; 364/560; 364/562; 364/559; 324/166; 324/171; 340/815.4; 340/815.78; 73/114
[58] Field of Search ................. 364/560, 561, 364/562, 559; 324/166, 171; 340/815.4, 815.78; 73/114

[56] References Cited

U.S. PATENT DOCUMENTS

| | | | |
|---|---|---|---|
| 3,977,238 | 8/1976 | Byington, Jr. | 73/114 |
| 4,167,699 | 9/1979 | Baker | 324/171 |
| 4,205,388 | 5/1980 | Steiner | 364/900 |
| 4,254,375 | 3/1981 | Matsuoka | 324/115 |
| 4,308,527 | 12/1981 | Moreau et al. | 340/366 D |
| 4,378,694 | 4/1983 | Bohm et al. | 73/114 |
| 4,803,646 | 2/1989 | Burke et al. | 364/561 |
| 4,939,675 | 7/1990 | Luitje | 364/550 |
| 4,968,930 | 11/1990 | Grupp et al. | 324/115 |

*Primary Examiner*—Emanuel T. Voeltz
*Assistant Examiner*—Hien Vo
*Attorney, Agent, or Firm*—Young & Basile, PC

[57] ABSTRACT

A non-linear scale instrument responsive to a sensor which generates an output signal proportional to the magnitude of a changeable condition. A visible scale includes spaced gradations over the total extent of the scale, with spacings between pairs of scale gradations varying across the scale. A control circuit, in response to the output signal of the sensor, determines the angular position of and drives a rotatable pointer across the scale to the angular position corresponding to the magnitude of the condition measured by the sensor. The control circuit also automatically converts between different measurement units at the user's selection to re-position the pointer corresponding to the measured condition in the selected units.

9 Claims, 2 Drawing Sheets

NON-LINEAR SCALE INSTRUMENT

BACKGROUND OF THE INVENTION

1. Field of the Invention

The present invention relates, in general, to data indicating instruments and, specifically, to data indicating instruments having a pointer movably traversing a scale.

2. Background Description

Vehicles, including motor powered vehicles such as automobiles, trucks, motorcycles, snowmobiles, etc., bicycles, watercraft and aircraft, and various machines, such as generators, compressors, etc., typically include one or more data display instruments showing various measured conditions or parameters, such as vehicle speed, engine rpm, water pressure, etc. In such instruments, a pointer or needle is rotated across a fixed scale bearing printed indicia corresponding to the measured data units, such as vehicle speed, engine revolutions or rpm's, pressure, etc.

Various means have been used to move the pointer across the scale in proportion to a sensor output. Such means have included, for example, air core movements, galvanometers, stepper motors and bi-metal drivers. In an air core gauge, for example, a plurality of coils mounted at various angles with respect to each other and are energized in accordance with an external event, such as a measured engine speed or engine revolution, to provide a resultant magnetic field for rotating a magnet. A shaft is mounted on the magnet and carries the pointer to an angular position across the fixed, printed scale to indicate the measured condition.

Various electronic or microprocessor based circuits have been utilized to receive the sensor output signals indicating a measured condition and to convert such sensor outputs to signal values proportional to the measured condition, which signals are supplied to the pointer movement means to rotate the pointer to the desired position in relation to the fixed scale to visibly indicate the magnitude of the measured condition.

The fixed scales for most instruments have included printed indicia at major condition or measured quantity increments, such as every ten miles per hour or every ten pounds of pressure, etc. For example, larger indicia, such as longer gradation lines are located at 10, 20, 30, mph etc., with smaller gradations or lines frequently disposed between the major gradations. The angular or linear spacing between the major gradations on such scales has typically been equal across the entire extent of such scales.

In a typical vehicle speedometer by way of example, the speedometer scale may range from 0 to 120 mph, with equal gradations at every 10 mph spaced at equal angular spacings across the arcuate extent of the scale. Since most vehicle operation takes place in the lower speed ranges, i.e., 20 to 50 mph, rather than at speeds approaching or exceeding 100 mph, the upper portion of such the speedometer scale is infrequently used. Although, such an equal graduated scale simplifies the drive electronics since the measured vehicle speed is approximately proportional to the amount of angular movement of the pointer, such a scale necessarily provides less precise resolution of visible speed at the lower speeds since the scale is designed to cover the entire speed range of 0 to 120 mph. Since most vehicle operations occur at lower speeds, i.e., 20 to 50 mph, rather than at the higher speeds, an easy reading of the precise magnitude of such lower speeds is difficult.

In an attempt to correct this deficiency, certain scale displays have been devised which include two overlaid or adjacent scales, one forming an expanded scale relative to the other, such as a first scale extending from 0 to 80 mph in the case of a vehicle speedometer; while the second overlaid scale extends between 0 and 40 mph over the same angular extent as the 0 to 80 mph scale. The gradations between major speed increments on each scale are equally spaced apart so as to enable a more accurate readout when the lower speed second scale is employed since the speed gradations on the second scale are spaced further apart which allows easier resolution of the exact vehicle speed when the second scale is employed. However, in such dual scale displays, it may be difficult to easily ascertain which scale is to be read due to the overlapping arrangement of the two scales.

Thus, it would be desirable to provide a data display instrument which is capable of providing a more precise resolution of a measured condition, such as vehicle speed for example, within a particular condition range.

Another factor which must be considered in creating vehicle condition data displays, such as vehicle speedometers results from the increased use of dual measurement units, i.e., mph and km/h, on vehicles manufactured and used throughout the world since the same type of vehicle may be used in different countries employing different speed measurement units. Typically, this problem has been addressed by printing two analog scales on a fixed substrate, one for mph and one for km/h. Each scale extends over the same angular extent or range and is provided with evenly spaced major speed gradations, although the spacing between major speed gradations on the mph scale is necessarily different than the spacing between major speed gradations on the km/h scale. In such a dual unit scale, the drive electronics receiving an input from the vehicle speed sensor is the same, with the desired one of the two scales being visually selected by the driver to determine vehicle speed in the desired units.

Thus, it would be desirable to provide a data instrument for displaying a predetermined measured condition or quantity which has a non-linear or uneven spacing between major marked incremental scale gradations across the full extent of scale for a more precise resolution and visual indication of the measured condition. It would also be desirable to provide a data display instrument for measuring vehicle speed which automatically switches between mph and km/h at the driver's selection, with the pointer movement being automatically adjusted to the selected units while still traversing only a single graduated scale.

SUMMARY OF THE INVENTION

The present invention is a non-linear scale instrument apparatus for displaying a measured, changeable condition or parameter.

The present apparatus is used with a sensor which measures a changeable condition or parameter and generates an output signal relative to the magnitude of the changeable condition. A visible scale includes a plurality of spaced gradations which are non-equally spaced apart over the extent of the scale. A pointer is movable relative to the scale. A control means, responsive to the output signal from the sensor, determines and positions the pointer along the scale at an angular position corresponding to the magnitude of the measured condition.

The scale may include a plurality of first pairs of gradations, each at identical first spacings and a plurality of second pairs of gradations disposed at identical second spacings, the second spacings being different from the first spacings between the first pairs of gradations. The first pairs of adjacent gradations on the scale are each optionally equally divided by at least a first subgradation. Each of the second pair of adjacent gradations on the scale may be subdivided by at least one second subgradation into different gradation increments having a different spacing than the spacing between the first subgradations and each adjacent gradation of the first pair of gradations.

Further, the dimensional extent or spacing between at least certain adjacent pairs of gradations on the scale can gradually vary across the scale. Such gradual variations may be on only a portion of the scale for certain pairs of spaced gradations or over the entire scale between all adjacent gradations.

The control means further includes means for converting the measured condition, in the particular case of vehicle speed, between different units, such as MPH and Km/h. A user select means signal is input to the control means and causes the control means to rescale the signal from the sensor in the selected units and to reposition the pointer to a new angular position in the selected units.

The control means also includes means for calculating the total distance travelled by a vehicle, means for accumulating the total distance travelled, and display means for displaying the total distance travelled by the vehicle. Further, the control means includes means for converting accumulated distance travelled between miles and kilometers in response to a user select input.

The non-linear scale instrument apparatus of the present invention uniquely provides a visible scale indicating a measured condition, such as a vehicle condition, i.e., vehicle speed, engine rpm, etc., which includes different scale portions having different angular or linear spacings between major condition increments. This enables a particular range of a measured condition, such as a particular vehicle speed range, to be more easily and visibly determined with precise resolution since the pointer on the scale will traverse an expanded portion of the scale over a larger annular or linear extent.

The present apparatus also automatically converts between MPH and Km/h units and between miles and kilometers when used as a vehicle speedometer at the user's selection. During such conversion, the apparatus automatically determines and repositions the pointer on the scale at an angular position corresponding to the magnitude of the measured condition in the user selected scale units, i.e., metric or English.

BRIEF DESCRIPTION OF THE DRAWING

The various features, advantages and uses of the present invention will become more apparent by referring to the following detailed description and drawing in which.

DESCRIPTION OF THE PREFERRED EMBODIMENTS

In general, the present invention is a non-linear scale instrument which provides a visual indication of a measured vehicle condition or parameter, such as vehicle speed, engine revolutions, fluid pressure, etc. Although the following description will be provided in conjunction with a vehicle speedometer, it will be understood that the present invention applies equally to other non-linear scale instruments, such as tachometers, oil or water pressure gauges, etc. Further, the term "vehicle" on which the present scale instrument can be utilized, includes any type of vehicle, such as a motor powered automobile, truck, snowmobile, motorcycle, etc., as well as bicycles, watercraft including motor driven watercraft, sailboats, jet skis, etc., and even aircraft.

It will also be understood that the non-linear scale instrument has equal applicability on machines of any type, such as generators and compressors, as well as in all applications where a measured condition or parameter is measured and visually displayed in a unit of measure.

Figure 1:
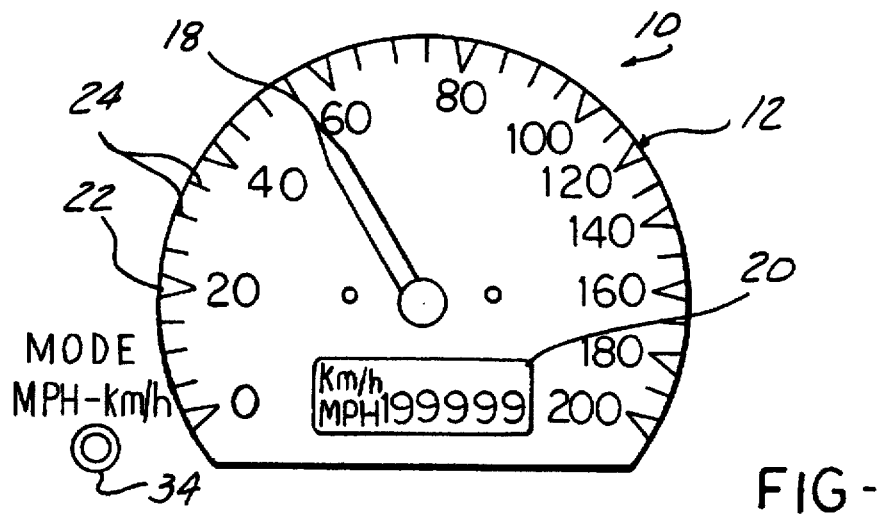
FIG. 1 is a front elevational view of an exemplary non-linear data display scale of the present invention.

Referring now to the drawing, and to FIG. 1 in particular, there is depicted a non-linear scale instrument 10 which provides a visible indication of a measured vehicle condition, in this exemplary case, vehicle speed. The scale 10 forms a part of a vehicle speedometer instrument may be printed or formed as part of a vehicle dashboard assembly or as part of a separate instrument, such as a stand alone speedometer.

The instrument 10 includes a vehicle speed scale 12, described in greater detail hereafter, a movable pointer 14 which pivots about a first end 16 and has a second tip or pointer end 18 traversing across gradations formed on the scale 12.

An optional odometer readout 20 may be provided within the confines of the scale 12 as shown in FIG. 1 or adjacent to the scale 12. Preferably, however, the odometer 20 comprises a digital display, such as LED, LCD or VF display, to visually present the total measured distance travelled by the vehicle. Separate indicia labelled "MPH" or "Km/h" are provided on the face or cover of the odometer 20 and individually shown or illuminated when the appropriate distance unit is selected, as described hereafter.

The scale 12 has an angular extent sufficient to encompass speeds ranging between 0 and 200 in either MPH or Km/h units. It will be understood that other speed ranges may also be provided, such as 0 to 120, etc.

The scale 12 has a non-linear or non-equi angular spacing between major gradations which divide the scale 12 into increments corresponding to different magnitudes of the measured condition or parameter. The non-linearity or non-equi angularity can be provided in several different ways. In one arrangement, the scale 12 is divided into two or more separate angular or linear portions, each covering a different total range of measured condition magnitudes. Alternately, the scale 12 may be provided with varying angular extent scale portions which progressively decrease from a larger angular extent from 0 to 20, for example, through smaller angular ranges or extents between each subsequent major speed gradation, such as 20 to 40, 40 to 60, etc. The varying angular scale portion can also increase in extent across the scale or be provided only in a particular portion of the scale.

In an exemplary embodiment, the scale 12 includes at least two differently gradated scale portions, such as a first scale portion extending between 0 and 100 and a second scale portion extending between 100 and 200 as shown in FIG. 1. Both of the scale portions are provided with major gradation indicia, such as enlarged markings 22 formed on the speedometer support on which the scale 12 is printed or formed. The enlarged markings 22 are disposed at a first equi-angular spacing in the first scale portion and at a second, different, equi-angular spacing in the second scale portion. Thus, by way of example only, the first scale portion of the scale 12 has major gradations labelled 0, 20, 40, 60, 80 and 100; while the second scale portion starts at the 100 gradation and includes major gradations 120, 140, 160, 180 and 200.

Any number of smaller or minor gradations may optionally be formed on the scale 12 between each pair of major speed gradations. Such minor gradations can correspond to a one mile per hour or km/h change or multiples thereof, such as 2 mph or km/h, etc.

According to the present invention, the first portion of the scale 12 has a larger angular extent per measured range than the second portion of the scale 12. This enables the angular extent or spacing between two adjacent pair of major speed gradations such as 20 and 40, to be greater than the angular extent or spacing between a pair of major speed gradations, such as 120 and 140, on the second portion of the scale 12. Accordingly, a larger number of minor gradations 24 can optionally be provided between each pair of major gradations 22 on the first portion of the scale 12 than between adjacent major speed gradations on the second portion of the scale 12. This enables a more precise resolution and an easy determination of vehicle speed in the lower speed range covered by the first portion of the scale 12 than when the vehicle speed is in the higher speed range covered by the second portion of the scale 12.

It will be understood that although the above description and FIG. 1 depicts the scale 12 as having only two discrete scale portions, the scale 12 can be constructed according to the teachings of the present invention with various combinations of varying angular extent scale portions. Thus, for example, the scale 12 may include three or more distinct scale portions, each extending over a different total angular extent. Alternately, depending upon the needs of a particular application, the scale 12 may be formed with a first scale portion extending between 0 and 40, in the case of a vehicle speedometer, and a second scale portion extending between 100 and 200 in which the angular spacing or extent between major speed gradations in each of the first and second scale portions is the same. In this example, an intermediate scale portion extending between major speed gradations 40 and 100 may be expanded over a larger angular extent than each of the first and second scale portions to provide a more precise resolution of engine speed within the 40 to 100 speed range.

Figure 2:
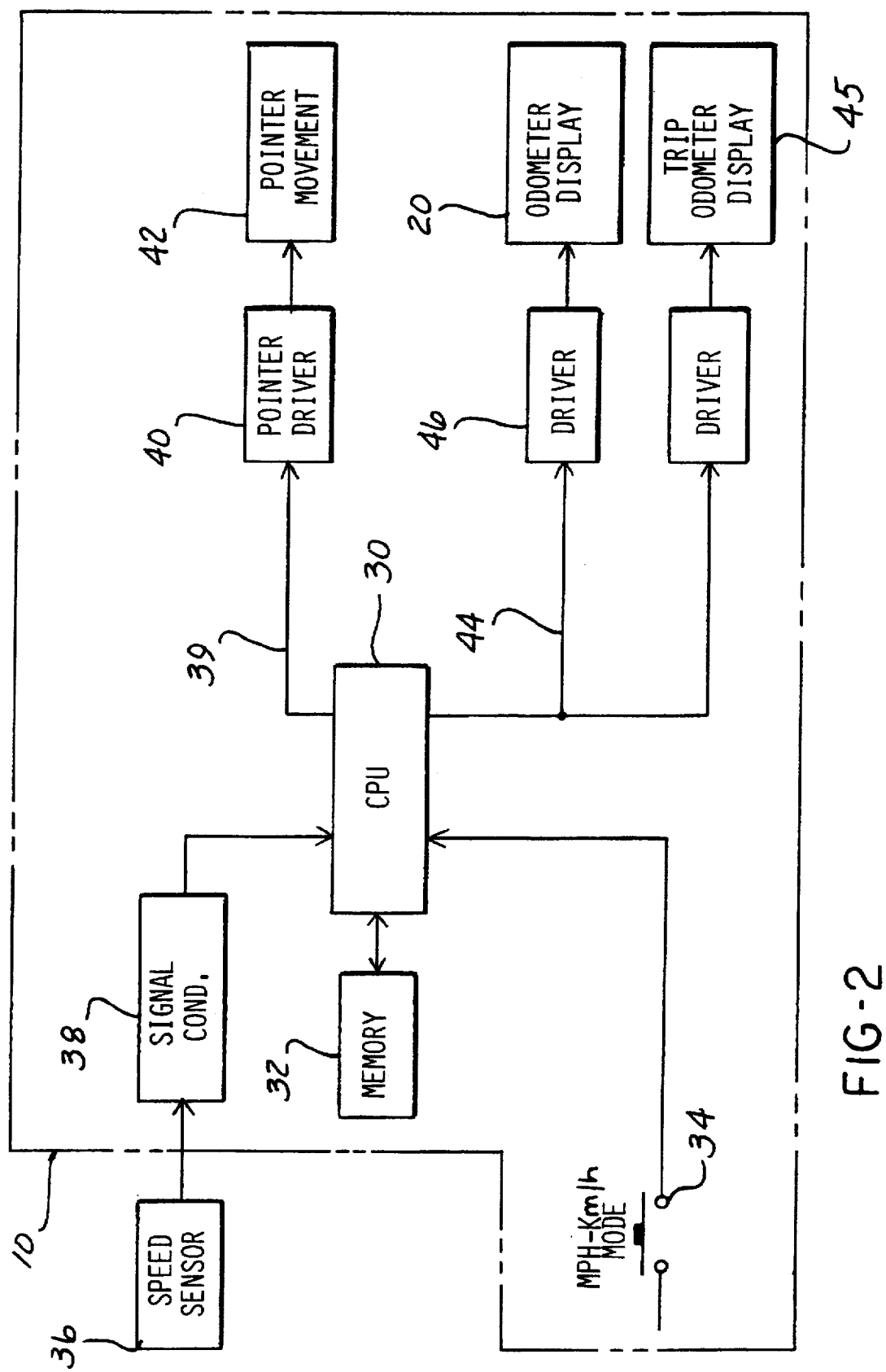
FIG. 2 is a block diagram of an exemplary non-linear scale apparatus constructed in accordance with the teachings of the present invention.

Referring now to FIG. 2, there is depicted an exemplary block diagram of the components forming the non-linear scale instrument 10 of the present invention.

As shown in FIG. 2, a control means includes a central processing unit (CPU) 30 which may be in the form of any conventional microprocessor, microcomputer or other device which is capable of executing a control program stored in a memory 32. The memory 32 may comprise any conventional memory storage device, such as a read/write memory, EPROM, EEPROM, etc. It will also be understood that the control means could easily be constructed of discrete electronic components to provide the following functions.

One input to the central processing unit 30 (hereafter "CPU"), is a mode selector input, typically in the form of a pushbutton 34, which is mounted at a suitable location on the vehicle, as shown in FIG. 1. The mode select pushbutton 34, in a preferred embodiment, is a single pole pushbutton connected to a suitable electric power source which provides an output signal to the CPU 30 upon each depression. The CPU 30 switches the measurement units between MPH and Km/h upon each depression of the mode select pushbutton 34 consecutively between MPH, Km/h, MPH, etc.

Also input to the CPU 30 is the output of a suitable engine speed sensor or transducer 36 which is mounted in a conventional location on the vehicle to measure actual vehicle speed. The output of the sensor 36 undergoes signal conversion in a signal conditioning circuit 38 to convert the output of the speed sensor 36 to a suitable digital form which is input to the CPU 30.

As described in greater detail hereafter, the CPU 30 provides a first output 39 proportional to actual vehicle speed as measured by the vehicle speed sensor 36 to a pointer driver 40 which generates appropriate signals to a pointer movement means 42, such as a air core, on which the pointer 14 is mounted. A second output 44 is optionally output from the CPU 30 to a driver 46 which provides appropriate control signals to the odometer display 20 shown in FIG. 1. The second output 44 may also be used to drive an optional trip mileage display 45. A trip reset pushbutton, not shown, may be provided to reset the trip display 45. The trip reset pushbutton can be a separate pushbutton, or it can be incorporated into the mode select pushbutton 34 in which, for example, a short depression of the pushbutton 34 provides a mode select signal and a long depression provides a trip reset signal.

Further, it will be understood that in addition to driving the pointer 14, the first output 39 from the CPU 30 may also be used to directly drive a digital speed display, not shown, mounted in or adjacent to the speedometer 10.

As the details of the pointer driver 40 and the pointer movement means 42 do not form part of the present invention and, further, since any conventional pointer movement means 42, such as an air core, described in U.S. Patent Nos. 4,553,093; 4,827,210 and 4,924,178, may be employed, further details of the pointer driver 40 and the pointer movement means 42 will not be provided herein. Such details can be had by referring to the aforementioned patents, the contents of which are incorporated herein by reference.

Figure 3:
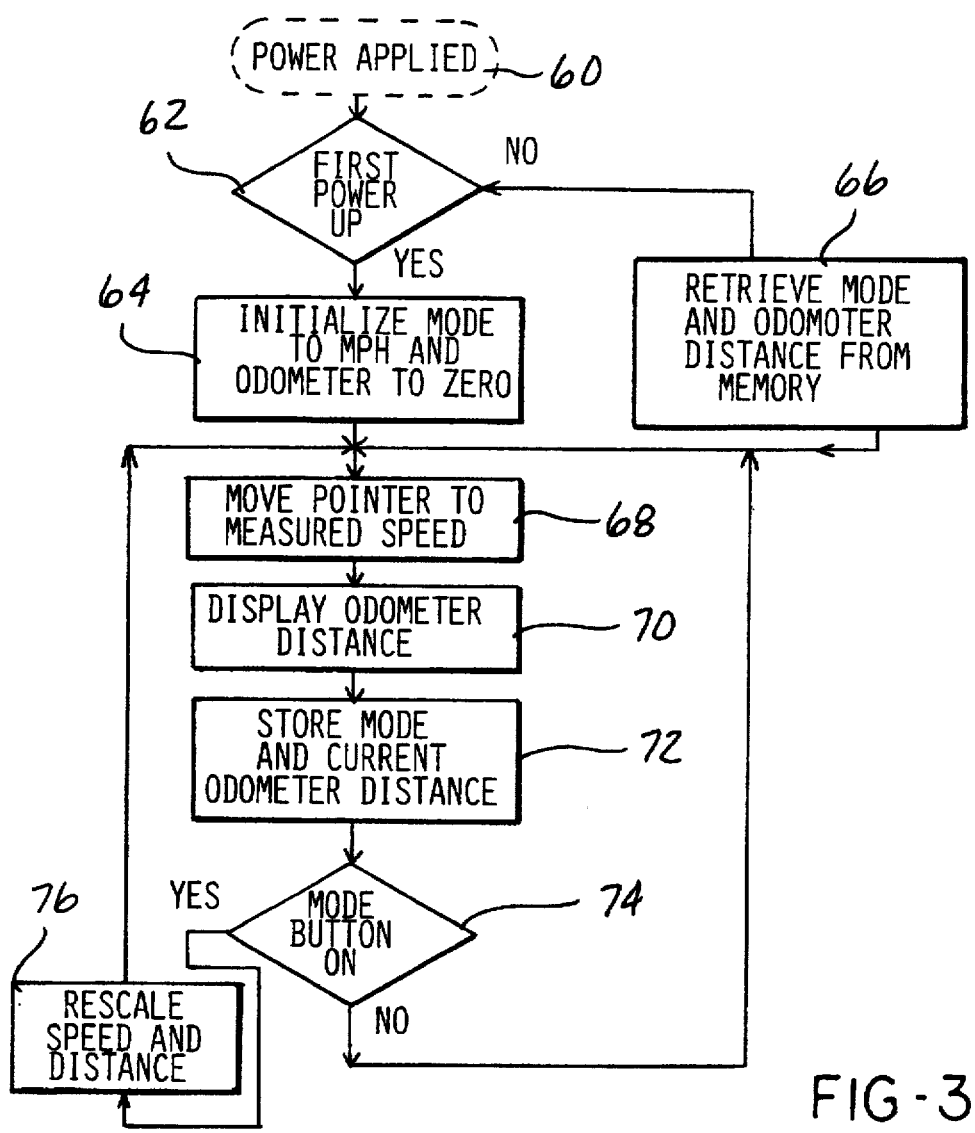
FIG. 3 is an exemplary flow diagram depicting the sequence of operation of the central processor shown in FIG. 2.

Referring now to FIG. 3, there is depicted an exemplary flow chart of the control program executed by the CPU 30 to drive the pointer 14 across the scale 12 in response to changing vehicle speeds measured by the vehicle speed sensor 36.

When electric power is applied for the very first time to the instrument 10 in step 60, the CPU 30, upon detecting the first power up in step 62, initializes the measurement units mode to the default unit of measure and retrieves from the memory 32 and outputs to the odometer display 20 a zero value for total vehicle distance.

After the first power up, if the CPU 30 detects any subsequent application of electric power to the speedometer 10, such as when the vehicle ignition is turned on during subsequent use of the vehicle, the CPU 30 retrieves from the memory 32 the current user selected unit mode, i.e., MPH or Km/h, as well as the total vehicle distance travelled, in the particular English or metric units from the memory 32 and outputs such information to the odometer display 20.

With this setup information, the CPU 30 is capable of displaying vehicle speed on the scale 12 in the selected MPH or Km/h mode in step 68 and the total vehicle travel distance on the odometer 20 in step 70.

At any time during operation of the vehicle on which the instrument 10 is mounted, the user may depress the mode select pushbutton 34 as shown in step 74. Each depression generates an output signal which is input to the CPU 30. Upon receiving each mode select signal, the CPU 30 in step 76 rescales the speed input signal and the total vehicle distance travelled by use of a conversion factor to the opposite units, such as from MPH to Km/h or from Km/h to MPH and distance from miles to kilometers or vice versa. The CPU 30 then re-executes steps 68, 70 and 72 to display the measured speed and total distance travelled in the selected units. It should be noted that the CPU 30, in storing the new scale units in the memory 32, is then able to display subsequent vehicle speed and total distance travelled in the last selected units upon the next application of power to the instrument 10, such as the next time the vehicle ignition is switched to the "on" position.

Assuming that the mode select pushbutton 34 is not depressed, during movement of the vehicle, continuous speed signals will be input to the CPU 30 from the speed sensor 36. The CPU 30, through a scale conversion, converts the speed signal from the sensor 36 to distance travelled for display on the odometer 20 and stores the total distance travelled in the memory 32 as described above. At the same time, in step 68, the CPU 30 determines the angular position of the pointer 14 corresponding to the measured speed signal as measured from a zero speed reference. The angular position of the pointer 14 is calculated mathematically by the CPU 30 or by the use of a look-up table stored in the memory 32 which correlates a particular digital representation of each measured speed increment to a particular angular position of the pointer 14 on the scale 12.

The CPU 30 also generates a signal on the first output line 39 to the pointer driver 40 to cause the pointer movement means 42 to move the pointer 14 to the angular position on the scale 12 corresponding to the measured vehicle speed. For example, assuming that zero vehicle speed represents a zero degree angular position of the pointer 14 on the scale 12, a speed input corresponding to a speed of 40 MPH will cause the CPU 30 to generate a signal on the first output line 39 to the pointer driver 40 to cause the pointer movement means 42 to move the pointer 14 to an angular position on the scale 12 corresponding to the 40 MPH speed gradation. The CPU 30 will output a different signal to the pointer driver 40 when a different speed is detected, such as 100 MPH, to move the pointer 14 to a different angular position on the scale 12 corresponding to the 100 speed gradation.

As the MPH and Km/h units do not linearly correspond, i.e., 40 MPH requires a different angular movement from the zero position than 40 Km/h, the CPU 30 rescales the pointer 14 angular position output signal for Km/h by means of a conversion factor. This enables the CPU 30 to generate an appropriate output signal to the pointer driver 40 and the pointer movement means 42 to position the pointer 14 at the appropriate angular position on the scale 12 regardless of whether MPH or Km/h units are selected by the user via the mode select pushbutton 34.

In a specific example, if the current mode select is MPH and the vehicle is travelling at 60 MPH, the CPU 30 will output a signal to the pointer driver 40 causing the pointer movement 42 to move to the speed gradation corresponding to 60 on the scale 12. If the user then depresses the mode select pushbutton 34 to convert the speed from MPH to Km/h, the CPU 30 according to the control program described above and shown in FIG. 3, rescales the pointer 14 angular position signal to move the pointer 14 to approximately the 100 Km/h speed gradation.

In this manner, the CPU 30 automatically moves the pointer 14 to the angular position on the scale 12 corresponding to the measured vehicle speed regardless of the angular position of the speed gradation on the scale 12. Thus, the CPU 30 automatically compensates for the different scale portions having different angular spacings between major speed gradations.

In summary, there has been disclosed a unique non-linear scale instrument including non-equally spaced scale gradations in which the instrument automatically moves a pointer across the scale to a position corresponding to a measured parameter despite the varying spacing between major condition graduations on the scale. The instrument of the present invention also automatically switches between MPH and Km/h, in the specific example of a vehicle speedometer, while still moving the pointer to the angular position corresponding to the measured actual vehicle speed.

What is claimed is:

1. A data display apparatus including a sensor for measuring and generating an output signal proportional to a changeable condition, the apparatus comprising:

a visible scale extending continuously from a first end to a second end and including a plurality of spaced gradations which are non-equally spaced apart over the extent of the scale, the gradations corresponding to a changing magnitude of a single measured changeable condition;

a pointer movable relative to the scale; and control means, responsive to the output signal from the sensor, for determining and positioning the pointer on the scale at an angular position with respect to the gradations corresponding to the measured condition.

2. The apparatus of claim 1 wherein the scale comprises:

a plurality of first pairs of gradations, each at identical first spacings; and a plurality of second pairs of gradations disposed at identical second spacings, the second spacings being different from the first spacings between the first pairs of gradations, at least one pair of the second pairs of gradations extending continuously from at least one pair of the first pairs of gradations.

3. The apparatus of claim 2 wherein:

each of the plurality of first pairs of adjacent gradations on the scale are divided by at least one first subgradation; and each of the plurality of second pairs of adjacent gradations on the scale are subdivided by at least one second subgradation.

4. The apparatus of claim 1 wherein:

the dimensional extent between at least certain adjacent pairs of gradations gradually varies.

5. The apparatus of claim 1 wherein:

the dimensional extent between each pair of adjacent gradations gradually varies over the entire extent of the scale.

6. A data display apparatus including a sensor for measuring and generating an output signal proportional to vehicle speed, the apparatus comprising:

a visible scale including a plurality of spaced gradations which are non-equally spaced apart over the extent of the scale;

a pointer movable relative to the scale; and control means, responsive to the output signal from the sensor, for determining and positioning the pointer on the scale at an angular position corresponding to the measured vehicle speed, the control means further including means for converting the output signal from the sensor between MPH and Km/h.

7. The apparatus of claim 6 further comprising:

user select means, input to the control means, for selecting the measured vehicle speed in one of MPH and Km/h; and the control means, responsive to the user select means, for positioning the pointer on the scale at an angular position corresponding to the measured vehicle speed in the selected one of MPH and Km/h.

8. The apparatus of claim 1 further comprising:

the control means including means for calculating the total distance travelled by the vehicle;

means for accumulating the total distance travelled; and display means for displaying the total distance travelled by the vehicle.

9. The apparatus of claim 8 wherein the control means further comprises:

means for converting accumulated distance travelled between miles and kilometers in response to a user select input.

* * * * *